Figure 1:
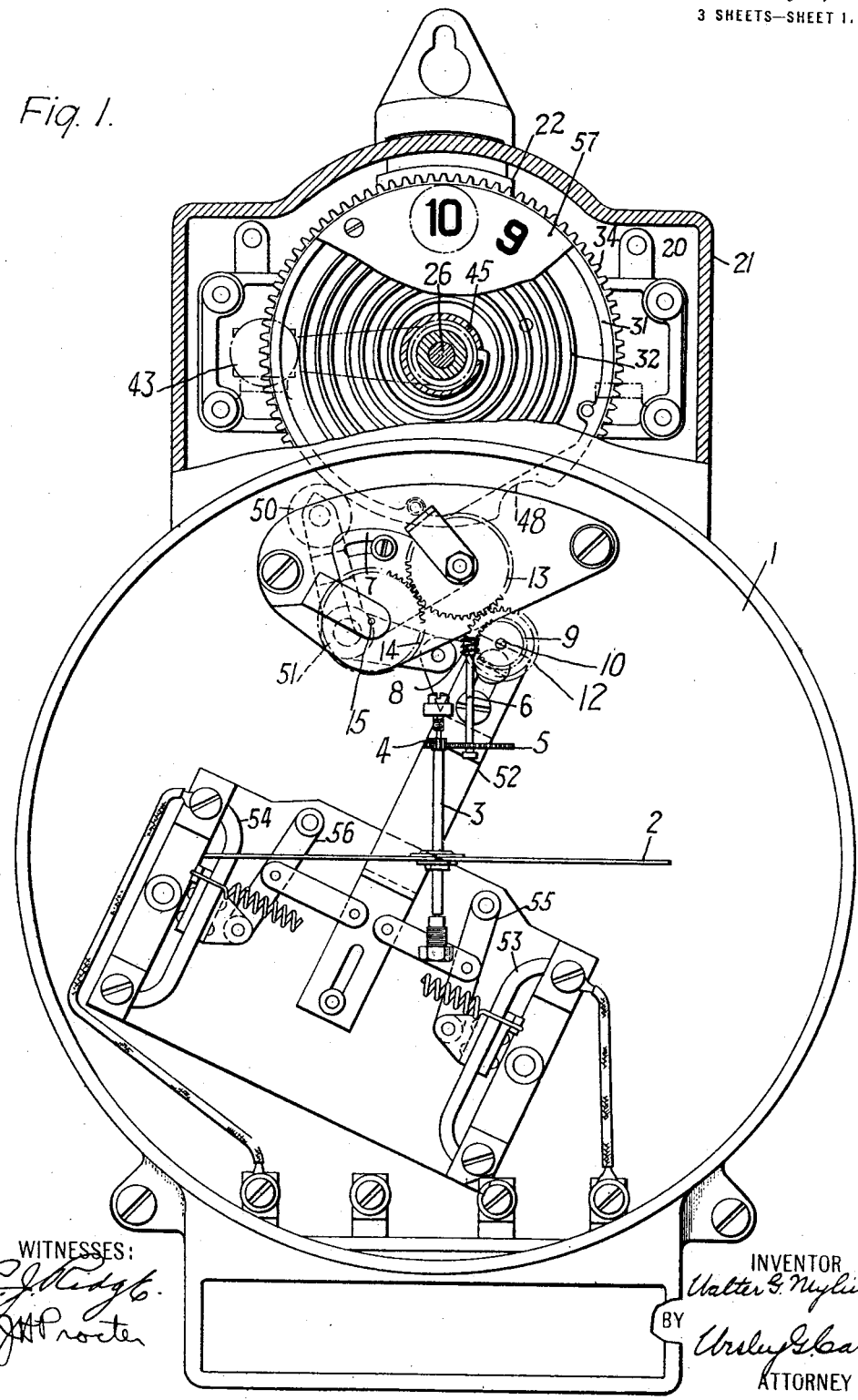

W. G. MYLIUS.
ELECTRICAL MEASURING INSTRUMENT.
APPLICATION FILED JUNE 5, 1913.

1,182,099.

Patented May 9, 1916.
3 SHEETS—SHEET 1.

WITNESSES:

INVENTOR
Walter G. Mylius
BY
Wesley G. Carr
ATTORNEY

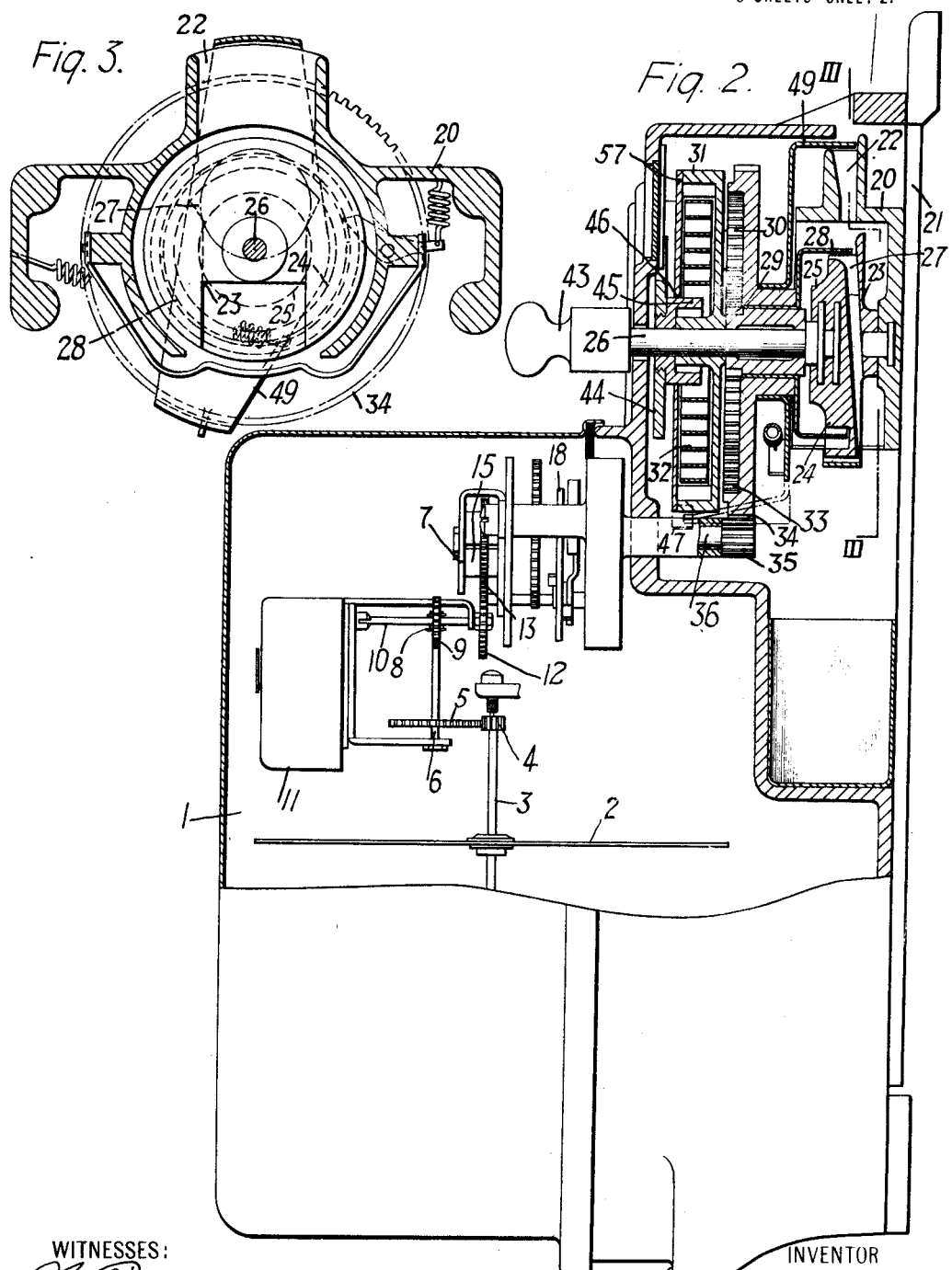

W. G. MYLIUS.
ELECTRICAL MEASURING INSTRUMENT.
APPLICATION FILED JUNE 5, 1913.
1,182,099.
Patented May 9, 1916.
3 SHEETS—SHEET 3.
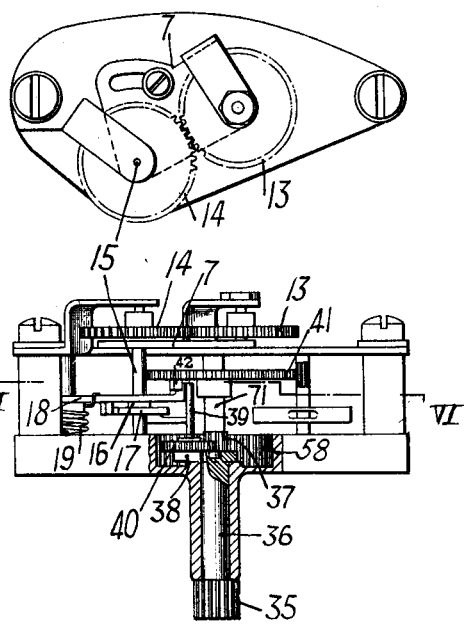
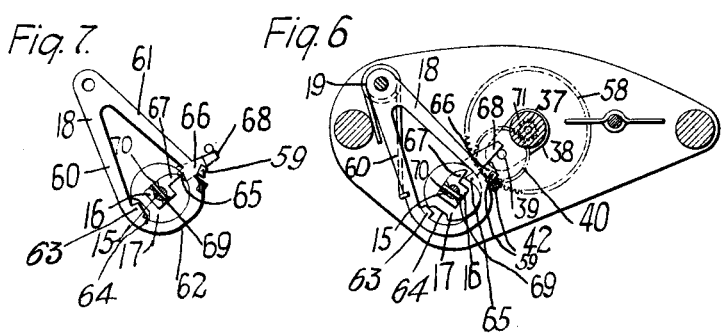
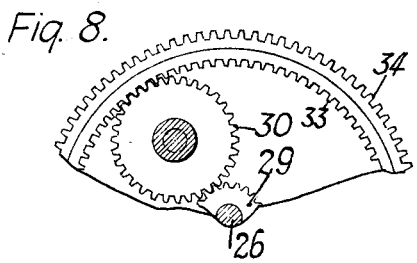
WITNESSES
INVENTOR
Walter G. Mylius
BY
Wiley G. Carr
ATTORNEY

UNITED STATES PATENT OFFICE.

WALTER G. MYLIUS, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,182,099.  Specification of Letters Patent.  Patented May 9, 1916.

Application filed June 5, 1913. Serial No. 771,880.

*To all whom it may concern:*

Be it known that I, WALTER G. MYLIUS, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and particularly to controlling means for watthour meters of the prepayment type.

The object of my invention is to provide a simplified controlling mechanism that may be disposed between the rotating member of an electrical measuring instrument and its main spring for controlling the tension of the spring.

Heretofore, prepayment watthour meters have been provided having a coin-operated main spring, a rotatable member or meter element and some means for controlling the tension on the said spring. However, in the devices of this type heretofore constructed, the controlling means was too complicated and cumbersome to be practicable.

I provide a single-lever controlling device that is actuated by two cams which are, in turn, operated by the main rotatable meter mechanism. My invention permits the controlling mechanism to occupy a minimum space and also provides greater accessibility for repair and adjustment.

Figure 1 of the accompanying drawings is a front view, partially in elevation and partially in section, of a prepayment meter embodying my invention; Fig. 2 is a side view, partially in elevation and partially in section, of the instrument shown in Fig. 1; Fig. 3 is a sectional view taken on the line III—III of Fig. 2; Fig. 4 is a front view of the adjustable driving gear wheels embodied in my invention; Fig. 5 is a view, partially in section and partially in plan, of the controlling mechanism that embodies my invention; Fig. 6 is a sectional view taken on the line VI—VI of Fig. 5; Fig. 7 is a detail view of the single lever control and the controlling cams embodied in my invention, and Fig. 8 is a fragmentary front elevational view of the gear wheel that winds the main spring of instrument.

An electrical measuring instrument 1 is provided with an armature 2 which is mounted on a shaft 3 that has a pinion 4 thereon. The pinion 4 engages a gear wheel 5 that is mounted on a second shaft 6 which is provided also with a worm screw 8. The worm screw 8 engages a worm wheel 9 that is mounted on a third shaft 10. The shaft 10 drives an integrating mechanism that is contained in an inclosing receptacle 11. A gear wheel 12, that is mounted on the shaft 10, engages a gear wheel 13 which also engages a gear wheel 14. The gear wheel 13 is mounted on a pin carried by a movable arm 7 that is so arranged that the gear wheel 12 may be of any predetermined size, depending upon the rate of speed desired in accordance with the price of the power to be metered.

The gear wheel 14 is mounted on a shaft 15 on which are also loosely mounted two cams 16 and 17 that are rigidly fastened together. The shaft 15 is also provided with a pin 69 that engages a slot 70 in the cam 16 to constitute a lost motion connection between the cams and the shaft 15. The cams 16 and 17 engage a lever 18 which is held in contact therewith by a spiral spring 19 having projecting ends that are respectively attached to the lever 18 and to the frame of the controlling mechanism. The lever 18 and the mechanism associated therewith, to be hereinafter more fully described, constitute the controlling mechanism for limiting the unwinding of the main spring of the prepayment mechanism.

The prepayment mechanism comprises a stationary casing 20 that is attached to the frame 21 of the instrument and has a projection, at its upper portion, having a slot 22 therein. The casing 20 is cut away at the bottom to permit the coins that are inserted to fall into a receptacle, when released after the mechanism has been rotated 180°, and to permit smaller coins than those for which the device is constructed to pass through. A disk 23, that is provided with two projections 24 and 25, is mounted on a shaft 26 to rotate in the casing 20. The disk 23 is provided with a slot 27 to receive a coin. The smaller portion of a cylindrical shell 28 having two portions of different diameters is mounted on a collar that has a pinion 29 formed thereon. The portion of the shell 28 having the larger diameter is disposed within the casing 20 and around the disk 23 and slots are cut in its upper and lower sides for the purpose of permitting coins to enter the slot 27 in the disk 23. The collar upon which is formed the pinion 29 is loosely mounted on the shaft 26 and the pinion engages a gear wheel 30 that is mounted on a stud projecting from a movable housing 31. The main spring 32 of the instrument is disposed in the housing 31. The gear wheel 30 engages the internal gear teeth 33 that are formed on a gear wheel that is loosely mounted on the shaft 26. External gear teeth 34 are provided on the outer surface of the loosely mounted gear wheel and they engage a pinion 35 that is mounted on a shaft 36.

An arm 38 is mounted on the shaft 36, and a pin 39, on which is pivotally mounted a gear wheel 40, is mounted on the arm 38. A shaft 71 is pivotally mounted in the end of the shaft 36 and is provided with a pinion 37 and a gear wheel 41 that has a projection 42 on its under side. A handle 43 is provided for rotating the shaft 26 to wind the main spring 32 when a coin of the correct denomination is inserted in the slot 27. The spring 32 has one of its ends attached to the spring case 31 and its other end to a member 44 that has a cup shaped member 45 attached thereto. The member 45 extends through an opening 46 in the case 31 to facilitate the desired connection. The spring case 31 has a projection 47 and a recess 48 in its outer surface, the former being adapted to actuate a cover member 49 for the coin opening and the latter to engage a roller 50, which, through a bell-crank lever 51, slides a bar 52 to operate the movable bridging contact members 53 and 54. Two toggle mechanisms 55 and 56 are interposed between the bar 52 and the movable contact members 53 and 54, respectively. A dial 57 is placed on the spring case 31 to indicate the tension on the spring 32 and, consequently, the number of coins to the customer's credit in the meter.

When a coin of the proper size is inserted in the slot 22, it becomes wedged between the disk 23 and one of the slots cut in the shell 28. If the handle 43 is rotated 180°, the shaft 26 is rotated and the disk 23 causes the shell 28 to rotate with it to operate the pinion 29. The rotation of the pinion 29 causes the gear wheel 30 to move around the annular gear wheel 33 to tension the spring 32 a predetermined amount. The tension of the spring is transmitted to the internal gear teeth 33 but the gear wheel is prevented from rotating by the gear teeth 34 on its outer surface that engages the pinion 35 on the shaft 36.

The gear wheel 40 that is mounted on the pin 39 engages an annular gear 58 that is formed in the base of the controlling mechanism. The lever 18 is provided with a projection 59 that is perpendicular to the plane of the lever 60 and is adapted to engage the projection 42 on the gear wheel 41 at predetermined times. The lever 18 comprises two arms 60 and 61 that are joined by a curved portion 62. The arm 60 is provided with a projection 63 on its inner side that engages a notch 64 in the cam 17. The arm 61 is provided with the projection 59, as hereinbefore described, and also with two projections 65 and 66 in a plane therewith, the former of which projects inwardly and the latter of which projects outwardly from the arm 61. The cam 16 is of a generally rectangular shape and is provided with a projection 67 that engages the projection 65 on the arm 61. The cam 17 is of a generally circular shape and is provided with a projection 68 that is in a plane parallel to the plane of the cam 17 and with a recess 64, as hereinbefore set forth.

Assume that the spring 32 has been wound by the insertion of a coin and the rotation of the arm 43, the roller 50 is disengaged from the recess 48 to operate the bar 52 which causes the contact members 53 and 54 to engage their respective stationary contact members. When the circuit is closed, the armature 2 rotates, causing the shafts 6 and 10 to also rotate. The rotation of the shaft 10 causes the gear wheel 12, the gear wheel 13 and the gear wheel 14 to rotate at a speed that is proportional to the rate of consumption of energy. Since the gear wheel 14 is mounted on the shaft 15, the cams 16 and 17 are also rotated at a speed that is proportional to the rate of consumption of energy. Normally, the projection 59 on the arm 61 engages the projection 42 on the gear wheel 41 to prevent the spring 32 from unwinding. As the shaft 15 rotates, the projection 67 on the cam 16 engages the projection 65 to move the lever 18 against the action of the spring 19 to disengage the projection 59 from the projection 42, thereby releasing the gear wheel 41. When the gear wheel 41 is released, the spring 32 unwinds to actuate the pinion 35 through the external gear teeth 34, the internal gear teeth 33, the pinion 30 and the spring case 31. The movement of the pinion 35 causes the arm 38 to turn, and, since the gear wheel 40 is mounted thereon and engages the internal gear teeth 58, the gear wheel 40 rotates around the pin 39 to actuate the gear wheel 41 through the pinion 37 and the shaft 71. The gear ratios are such that the gear wheel 41 may rotate a number of times while the pin 39 makes one complete revolution. After the pin 39 has made one complete revolution, it engages the projection 68 that is moved relatively to the shaft 16 until the projection 63 is forced from the recess 64 in the cam 17, thus moving the lever 18 against the action of the spring 19 so that the projections 42 and 59 are again engaged to prevent further unwinding of the main spring 32. Thus, for every rotation of the shaft 15, the main spring is permitted to unwind a predetermined amount and, since the speed of rotation of the shaft 15 is proportional to the rate of consumption of energy, the main spring is unwound a predetermined amount after a predetermined amount of energy has been consumed. The final unwinding of the spring 32 moves the recess 48 until it engages the roller 50. The springs connected to the contact members 53 and 54 cause the bar 52 to move downwardly and the roller 50 to enter the recess 48 to thus open the circuit. When as many coins as the main spring 32 is calibrated for have been inserted, the projection 47 engages a projection on the cover member 49 to rotate the same to cover the openings to prevent further insertion of coins. As soon as the spring 32 has been unwound a predetermined amount, the spring causes the cover member 49 to open the slot 22 again. The unwinding of the spring 32 causes the dial 57 to rotate, since it is connected to the spring housing 31 so that, at any instant, the number of coins to the customer's credit is indicated.

While I have shown my invention in connection with a prepayment wattmeter, it is evident that it may be employed equally well with any form of instrument requiring a controlling mechanism without departing from the spirit of my invention.

I claim as my invention:

1. A controlling device comprising a lever having a plurality of projections thereon, a cam member for operating the said lever, a rotatable member restrained from rotation by the said lever, and means operatively connected to said rotatable member for coöperating with the said cam member for resetting the said lever after the rotatable member has been released.

2. A controlling device comprising a lever having a plurality of projections thereon, a cam member that is continuously operated, a rotatable member that is normally under a tension, a projection on the said rotatable member that engages one of the said projections on the said lever for restraining the same, and a second rotatable member having a projection thereon that engages the said cam member after the rotatable member has rotated a predetermined amount.

3. A controlling device comprising a rotatable member that is to be rotated under predetermined conditions, a lever having projections thereon and adapted to restrain the said rotatable member, a cam member that is continuously operated for actuating the said lever to release the said rotatable member, and means for actuating the said lever through the said cam member to again restrain the operation of the said rotatable member.

4. A controlling device comprising a rotatable member that is to be rotated under predetermined conditions, a lever having projections thereon and adapted to restrain the said rotatable member, a continuously rotated shaft, a cam mounted thereon and having a lost-motion connection therewith and adapted to operate the said lever to release the said rotatable member, and means for moving the said cam relative to the said shaft.

5. In an electrical measuring instrument, the combination with a rotatable armature and a main spring, of a controlling mechanism comprising a shaft operated by the said armature, a cam mounted thereon and having a lost-motion connection therewith, a lever having a plurality of projections thereon and operated by the said cam, and a rotatable member operatively connected to the said main spring and restrained from rotation by the said lever, said lever being adapted to release the said rotatable member under predetermined conditions.

6. In an electrical measuring instrument, the combination with a rotatable armature and a main spring, of a controlling mechanism comprising a shaft operated by the said armature, a cam mounted thereon and having a lost-motion connection therewith and having a plurality of cam faces, a lever having a plurality of projections that are engaged by the said cam faces, and a rotatable member operatively connected to the said main spring and restrained from rotation by a projection on the said lever.

7. In an electrical measuring instrument, the combination with a rotatable armature and a main spring, of a controlling mechanism comprising a shaft operated by the said armature, a cam mounted thereon and having a lost-motion connection therewith and having a plurality of cam faces, a lever disposed around the said cam and having a plurality of projections thereon that are engaged by the said cam faces, and a rotatable member operatively connected to the said main spring and restrained from rotation by a projection on the said lever.

8. A controlling device comprising a shaft that is continuously operated, a cam mounted thereon and having a lost-motion connection therewith, a lever disposed around the said cam and having a plurality of projections thereon, a rotatable member having means thereon for engaging one of the projections on the lever, and means operatively connected to the said rotatable member for operating the said cam relatively to the said shaft.

9. In an electrical measuring instrument the combination with a rotatable armature and a main spring, of a shaft, an adjustable gear train between the said shaft and the said armature, a cam mounted on the said shaft and movable relatively thereto, a lever operated by the said cam, a rotatable member operated by the said main spring, means for restraining the said rotatable member, and means operatively connected to the said rotatable member for operating the said cam relatively to the said shaft.

10. In an electrical measuring instrument, the combination with a rotatable armature and a main spring, of a shaft, actuated by the said armature, a cam mounted on the said shaft and movable relatively thereto, a lever operated by the said cam, a second spring for maintaining the said lever in engagement with the said cam, a rotatable member operated by the said main spring, means for restraining the said rotatable member, and a pin operated by the said rotatable member for operating the said cam relatively to the said shaft.

11. In an electrical measuring instrument, the combination with an integrating watt-hour meter mechanism, a tension spring and means for winding the said spring, of a controlling mechanism interposed between the said spring and the said integrating mechanism and comprising a single lever having a series of projections thereon, and a lever actuating cam element actuated by the said integrating mechanism.

12. In an electrical measuring instrument, the combination with an integrating watt-hour meter mechanism, a main spring, a lever, a plurality of gear wheels operatively connected to the said lever and the said spring and a shaft for transmitting the tension of the said spring, of a controlling mechanism connected to the said shaft and to the said integrating mechanism, a single lever having a plurality of projections thereon, a cam device actuated by the said integrating mechanism for operating the said single lever.

In testimony whereof, I have hereto subscribed my name this 28th day of May 1913.

WALTER G. MYLIUS.

Witnesses:
 B. B. HINES.
 M. C. MERZ.